April 17, 1928. 1,666,806
N. L. WRIGHT
RADIATOR ORNAMENT
Filed Dec. 29, 1926
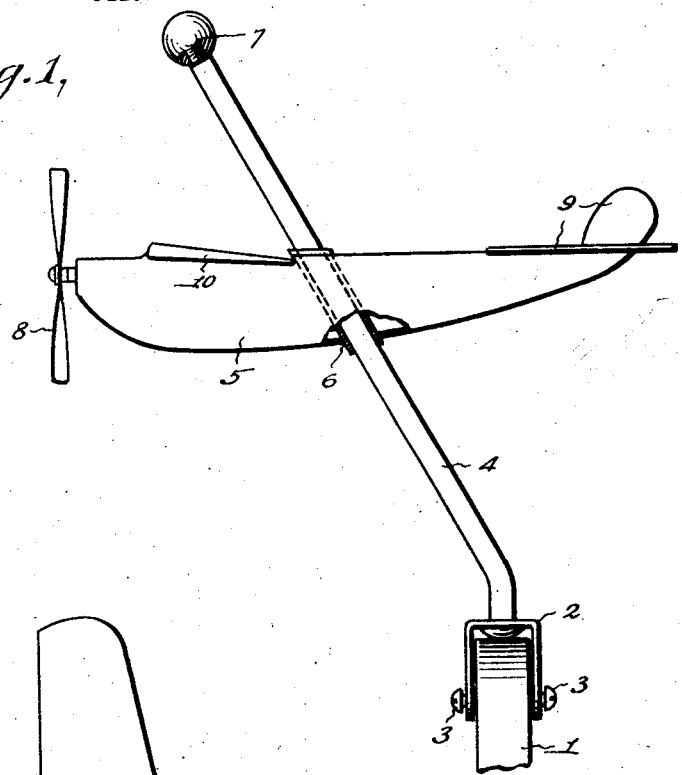
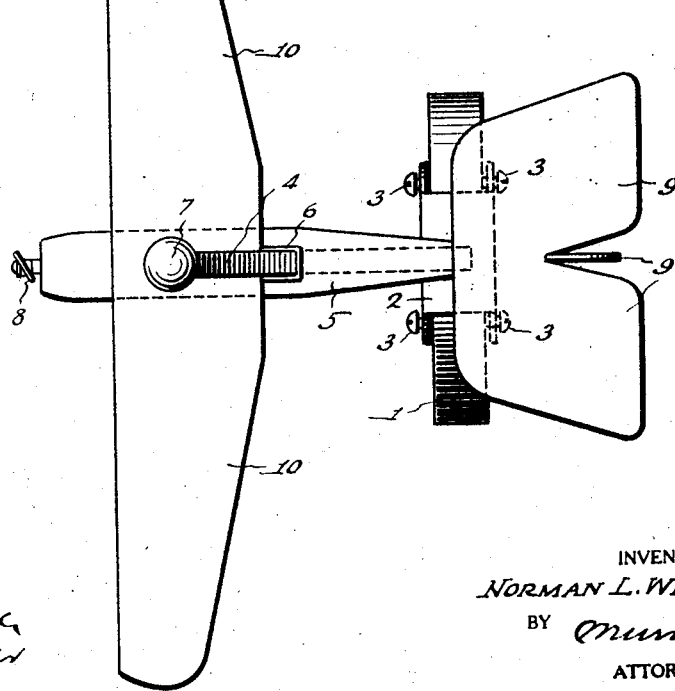
WITNESSES
INVENTOR
NORMAN L. WRIGHT
BY
ATTORNEYS Patented Apr. 17, 1928.

1,666,806

UNITED STATES PATENT OFFICE.

NORMAN L. WRIGHT, OF MOUNT VERNON, NEW YORK.

RADIATOR ORNAMENT.

Application filed December 29, 1926. Serial No. 157,737.

This invention relates to radiator ornaments as its primary use is that of an ornamental attachment for automobile radiators, but I wish it distinctly understood that I do not limit myself to this use but desire to cover the device broadly for use in connection with any type of vehicle, boat or other moving part.

An object of the invention is to provide a device of this character which will not only be ornamental and attractive in appearance but which will have the function of rising and falling, in accordance with the speed of the vehicle.

A further object is to provide a device of this character which may be readily attached and which will be caused to move by the draft or current of air induced by the movement of the vehicle, said current of air causing the device to rise and fall in a predetermined path, and while I have illustrated and shall describe the device as a miniature airplane it is to be distinctly understood that the device may take many different forms, all of which will embody the same idea of having a vertical movement induced by the air due to the movement of the vehicle.

With these and other objects in view, the invention consists in certain novel features of construction and combinations and arrangements of parts, which will be more fully hereinafter described and pointed out in the claim.

In the accompanying drawings—

Figure 1 is a view in side elevation, partly broken away, illustrating my improved device in operative position;

Figure 2 is a top plan view of the device, shown in Figure 1.

1 represents a support, which we may assume to be the heater of an automobile radiator, although as above stated the invention may be adapted to various other uses. 2 is a clamp or other means which is adapted to rigidly secure the device to the support 1, and this clamp may take the form of a bifurcated bracket with screws 3 to secure the same to the support, or it may take various other forms which will provide a rigid support and coupling means for a post 4.

This post 4 inclines from its lower to its upper end and this incline is preferably forwardly of the device on which it is supported.

5 represents a movable device which has a sleeve 6 receiving the post 4, and a removably, preferably threaded, enlargement 7 is screwed onto the upper end of the post 1 to prevent the device 5 from accidental removal from the post.

In the drawings, the particular device illustrated simulates in appearance an airplane and is, in effect, a miniature airplane having a propeller 8 at one end, guiding vanes 9 at its rear end, and laterally projecting inclined wings 10 adjacent its forward end. This device 5 may be of metal or any other suitable material, ornamented in any desired manner, but in any case will be provided either with wings 10 or some analogous means which will, due to the current of air, induce an upward movement of the device 5. Hence, when the vehicle is moving, the device 5 will move upwardly on the post 4 in accordance with the draft and speed of the vehicle. As the speed increases, the device will move higher, and as it decreases, the device will drop down the post.

The device 5 is shown of angular form with the sleeve 6 of corresponding shape to prevent any turning movement of the device 5 on the post, but it is obvious that the post and sleeve might be otherwise shaped and, in fact, rotary movement with some device might be desirable, and I do not wish to be limited in this respect.

I would call particular attention to the fact that the rod 4 is preferably inclined. This not only offers resistance to the vertical movement of the device 5, but it also prevents to some extent the direct transmission of vibrations of the vehicle to the device 5. In other words, if the post 4 were vertical, the vibrations of the vehicle would cause the device to jump up and down, and this tendency is overcome to a large extent by inclining the post.

While I have illustrated what I believe to be a preferred embodiment of my invention, it is obvious that various changes and alterations might be made in the general form of the parts described without departing from the invention and hence I do not limit myself to the precise details set forth but consider myself at liberty to make such changes and alterations as fairly fall within the spirit and scope of the appended claim.

I claim:

A radiator ornament, including means for attaching same to the radiator cap of an automobile, a forwardly inclined upwardly projecting post angular in cross section secured to said means and held against movement thereby, a movable part simulating in appearance an airplane, the fuselage of which is slidably mounted on the post, said fuselage having an opening therethrough receiving the post and conforming in shape to the angular shape of the post whereby the ornament is held against turning movement thereon and forward movement of the automobile through the medium of the draft created will cause the part to move upwardly and forwardly on the post.

NORMAN L. WRIGHT.